(12) United States Patent
St. Amant et al.

(10) Patent No.: US 8,337,604 B1
(45) Date of Patent: Dec. 25, 2012

(54) SYSTEM FOR REMOVING UNWANTED CONTAMINATES FROM GASES

(75) Inventors: Jefferey St. Amant, League City, TX (US); Kenneth R. Matheson, Corpus Christi, TX (US); Keith Nathan, Seabrook, TX (US)

(73) Assignee: Vapor Point, LLC, La Porte, TX (US)

( * ) Notice: Subject to any disclaimer, the term of this patent is extended or adjusted under 35 U.S.C. 154(b) by 0 days.

(21) Appl. No.: 13/191,815

(22) Filed: Jul. 27, 2011

Related U.S. Application Data

(63) Continuation of application No. 12/365,567, filed on Feb. 4, 2009, now abandoned.

(60) Provisional application No. 61/065,720, filed on Feb. 14, 2008, provisional application No. 61/063,901, filed on Feb. 6, 2008.

(51) Int. Cl.
| | |
|---|---|
| *B01D 53/14* | (2006.01) |
| *B01D 47/02* | (2006.01) |
| *B01D 47/00* | (2006.01) |
| *B01D 47/14* | (2006.01) |
| *F02M 17/28* | (2006.01) |
| *F02M 29/04* | (2006.01) |
| *C10J 1/10* | (2006.01) |
| *F24F 3/14* | (2006.01) |

(52) U.S. Cl. ............ 96/351; 96/329; 96/352; 96/354; 96/290; 95/154; 95/210; 95/211; 95/230; 95/237; 261/119.1; 261/100; 261/94

(58) Field of Classification Search .............. None
See application file for complete search history.

(56) References Cited

U.S. PATENT DOCUMENTS

| | | | | |
|---|---|---|---|---|
| 3,596,440 | A | * | 8/1971 | Nutter et al. .................. 55/320 |
| 3,749,377 | A | * | 7/1973 | Slater et al. .................. 261/78.2 |
| 4,657,566 | A | * | 4/1987 | Wintering et al. ............. 95/205 |
| 5,004,486 | A | * | 4/1991 | Chen ............................. 96/240 |
| 5,050,603 | A | * | 9/1991 | Stokes et al. .................. 123/523 |
| 5,064,450 | A | * | 11/1991 | Lankton et al. ................ 95/211 |
| 5,122,165 | A | | 6/1992 | Wang et al. |
| 5,217,616 | A | * | 6/1993 | Sanyal et al. ................. 210/617 |
| 5,494,614 | A | * | 2/1996 | Gohara et al. ................ 261/124 |

(Continued)

OTHER PUBLICATIONS

The definition of "fluid" as found in dictionary.com. http://dictionary.reference.com/browse/fluid (Dec. 20, 2011).*

*Primary Examiner* — Duane Smith
*Assistant Examiner* — Pankti Patel
(74) *Attorney, Agent, or Firm* — Buskop Law Group, PC; Wendy Buskop

(57) ABSTRACT

A system for removing unwanted contaminates from gases using a scrubber, which comprises a housing, a reaction chamber having a liquid level, an inlet connected to a source containing gases to be scrubbed with a contamination concentration greater than zero ppb to saturation. A gas exit port connected to the housing is used for evacuating scrubbed gas and a sintered permeable membrane is disposed across the reaction chamber, which provides a reaction zone in the plurality of pores when gases to be scrubbed are introduced to the membrane on a first side while the membrane is immersed in the lean liquid; and a cleaned gas on a second side wherein the clean gas initially has a drop in contamination concentration of at least 99 percent and gradually decreasing to 70 percent as additional gases to be scrubbed are introduced to the plurality of pores without replacing the lean liquid.

12 Claims, 8 Drawing Sheets

U.S. PATENT DOCUMENTS

| | | | | |
|---|---|---|---|---|
| 5,635,394 | A * | 6/1997 | Horn | 435/266 |
| 5,753,189 | A * | 5/1998 | Rehmat | 422/110 |
| 6,447,585 | B1 * | 9/2002 | Buchholz et al. | 96/234 |
| 6,462,098 | B1 * | 10/2002 | Vogel et al. | 518/700 |
| 6,759,018 | B1 * | 7/2004 | Arno et al. | 423/210 |
| 7,147,689 | B1 * | 12/2006 | Miller | 95/92 |
| 2001/0045162 | A1 * | 11/2001 | McQuigg et al. | 95/218 |
| 2006/0213370 | A1 * | 9/2006 | Leonard et al. | 96/243 |
| 2007/0157807 | A1 * | 7/2007 | Castagnos et al. | 95/271 |
| 2007/0251393 | A1 * | 11/2007 | Pope et al. | 96/329 |
| 2008/0014350 | A1 * | 1/2008 | Carlson et al. | 427/255.21 |
| 2008/0245232 | A1 * | 10/2008 | Getz | 95/93 |
| 2011/0067994 | A1 | 3/2011 | Moorhead et al. | |

* cited by examiner

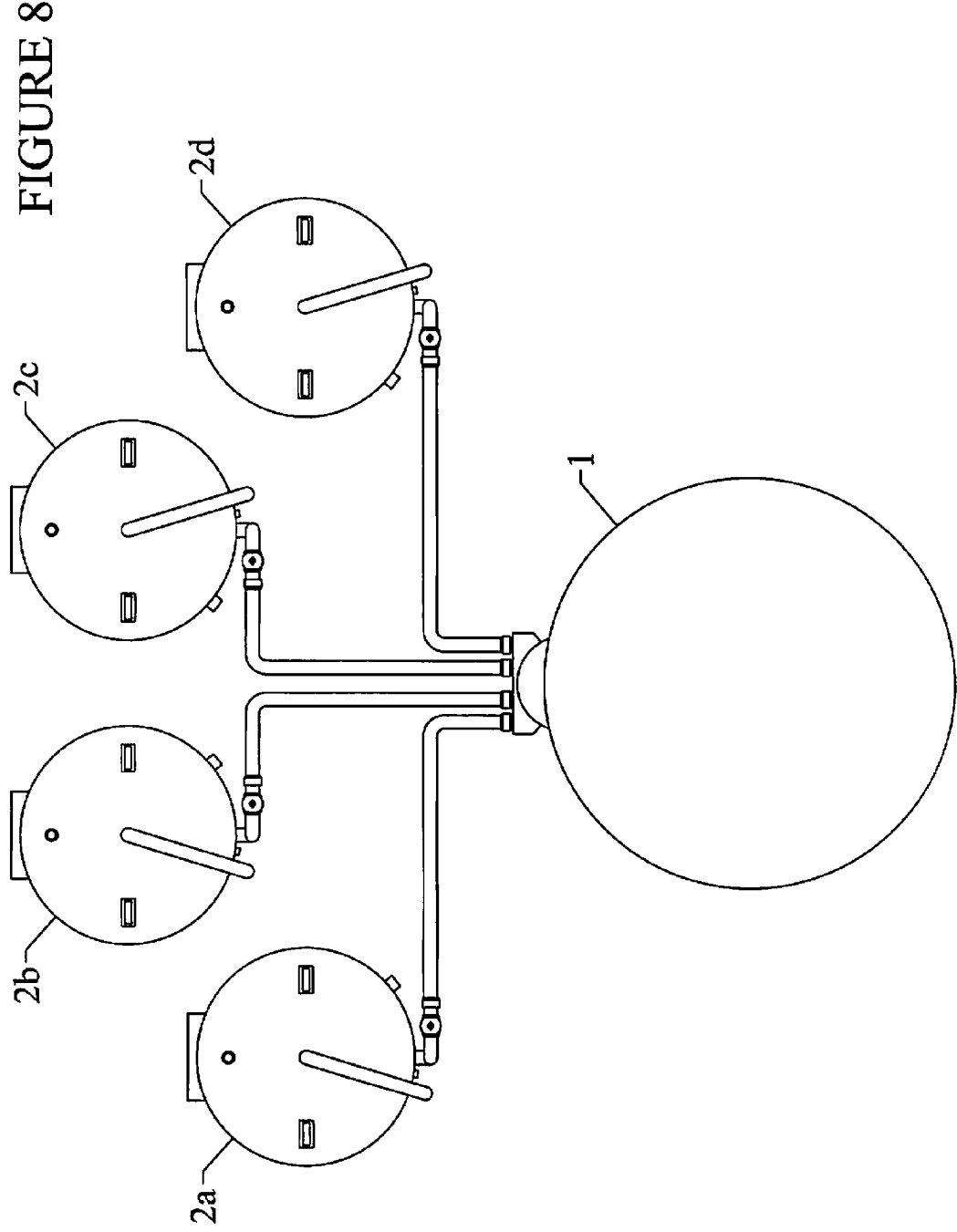

SYSTEM FOR REMOVING UNWANTED CONTAMINATES FROM GASES

CROSS REFERENCE TO RELATED APPLICATIONS

The present application is a Continuation of co-pending U.S. patent application Ser. No. 12/365,567 filed on Feb. 4, 2009, entitled "SYSTEM FOR REMOVING UNWANTED CONTAMINATES FROM GASES," which claims priority to and the benefit of U.S. Provisional Application Ser. No. 61/063,901 filed on Feb. 6, 2008, entitled "Gas/liquid contact device" and U.S. Provisional Application Ser. No. 61/065,720 filed on Feb. 14, 2008, entitled "Gas/liquid contact device". These references are incorporated herein in their entirety.

FIELD

The present embodiments generally relate to a system for removing unwanted contaminates from gases.

BACKGROUND

A need exists for a gas scrubber with up to about 100 percent efficiency and no less than about 70 percent efficiency.

A further need exists for a gas scrubber that does not require utilities and does not generate heat.

A further need exists for a gas scrubber that is low pressure to operate, which is safer than other scrubbers that operate at high pressures.

A need exists for a gas scrubber that can be connected in series or in parallel, which can further be a truck or a barge loaded, or welded to a facility for flexibility of use.

The present embodiments meet these needs.

BRIEF DESCRIPTION OF THE DRAWINGS

The detailed description will be better understood in conjunction with the accompanying drawings as follows:

FIG. 8 shows scrubbers connected in parallel according to an embodiment of the invention.

Figure 1:
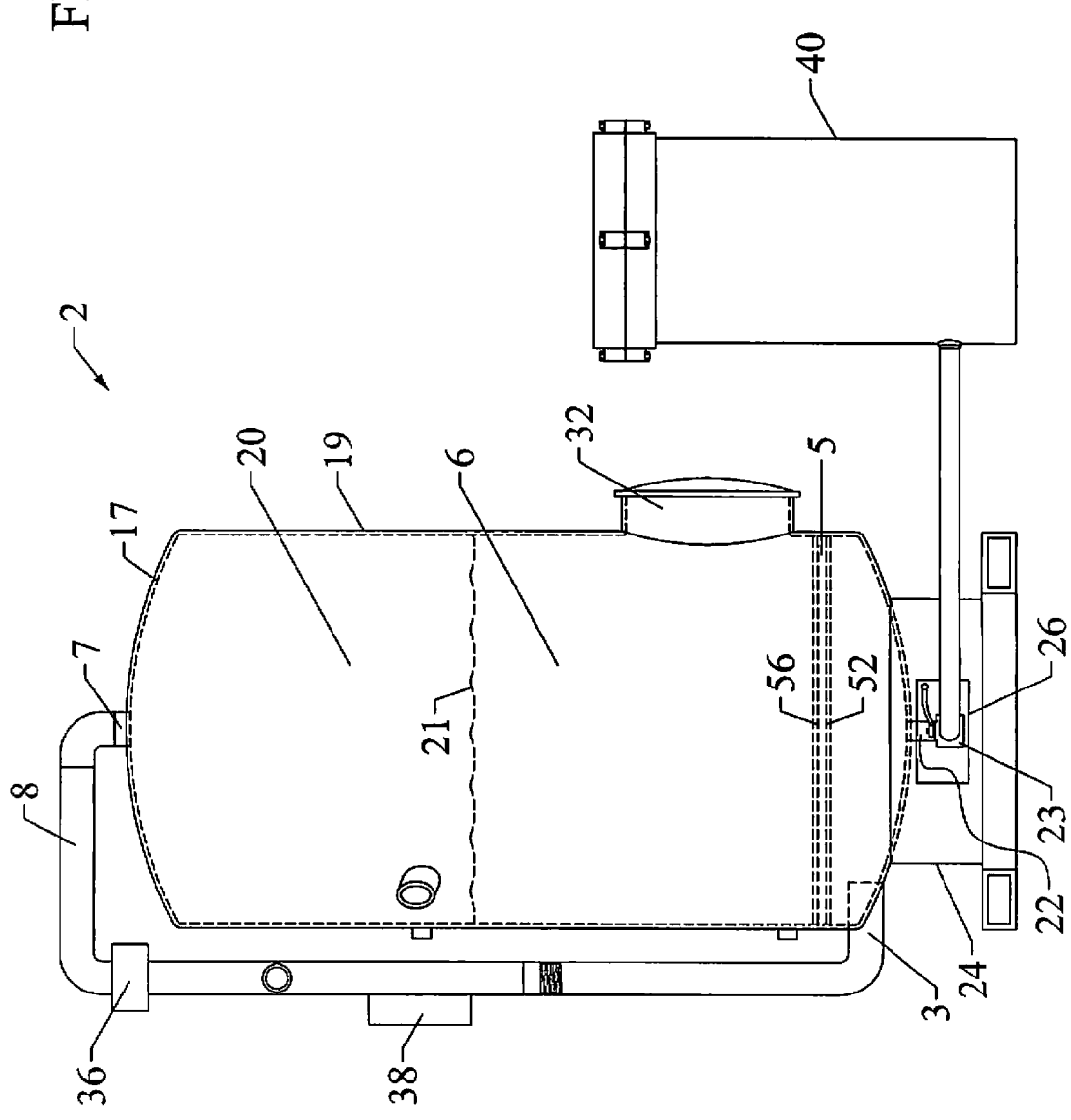
FIG. 1 is schematic drawing of the overall system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for removing unwanted contaminates from gases.

The present embodiments can further relate to a system for removing unwanted contaminates from gases using a scrubber, which comprises a housing, a reaction chamber having a liquid level, an inlet connected to a source containing gases to be scrubbed with a contamination concentration greater than zero ppb to saturation. A gas exit port can be connected to the housing and can be used for evacuating scrubbed gas and a sintered permeable membrane can be disposed across the reaction chamber, which provides a reaction zone in the plurality of pores when gases to be scrubbed are introduced to the membrane on a first side while the membrane is immersed in the lean liquid; and a cleaned gas on a second side wherein the clean gas initially has a drop in contamination concentration of at least 99 percent and gradually decreasing to 70 percent as additional gases to be scrubbed are introduced to the plurality of pores without replacing the lean liquid.

The housing can have up to a 48 inch diameter and a height up to 72 inches, seam to seam.

The housing can be made from carbon steel, stainless steel or steel alloys, aluminum, bronze, brass copper, polyethylene, polypropylene, tungsten, PVC, reinforced fiberglass, concrete or combinations of these materials. The housing can have one or more reinforcing ribs on either the inside or outside of the scrubber. The housing is resistant to explosion with pressures up to about 25 psi. In one or more embodiments, the housing can resist explosion at internal pressures up to about 2500 psi.

The housing can be mounted on a pedestal horizontally or vertically. The housing can be a ball or a rounded rectangular housing. The pedestal can support the housing, which as described herein can be referred to as "scrubber". The pedestal can have an access port that connects to a drain port in the housing. The pedestal can be a ferrous or non-ferrous material but must be strong enough to support the weight of the housing with other components installed therein. The pedestal can be modular with the housing, that can be removably detachable from the housing, so that both units can be easily truck mounted without the need for special permits when moved on a highway.

In an embodiment, the pedestal can be a mobile trailer, that is, a moveable pedestal as a trailer, but can be fixed into the trailer construction.

The embodied system can be usable with a modular transportable system for removing unwanted contaminates from gases, comprising: a movable transport vehicle and a removably modular scrubber disposed on the moveable transport vehicle.

An example of a movable transport vehicle can be a barge, a trailer, a barge with a trailer disposed on the barge, a truck, a ship, a rail car with a trailer disposed thereon.

The embodied system can also be usable with a vacuum truck, wherein the system can further comprise a vacuum truck with a bed with at least one vacuum pump having a vacuum pump exhaust and at least one scrubber integrally and non-removably connected to the bed of the vacuum truck, wherein the at least one scrubber engages the vacuum pump exhaust, and subsequent scrubbers can be connected in series to the at least one scrubber.

As a benefit, the system does not require hooking up to any plant, municipal or state utilities to operate. The system can be truck mounted, and using pressure and minimal energy, produces "cleaned" or "scrubbed gas" that meets federal codes for clean air. No outside service needs to be planned for, and the scrubber can be used in remote or isolated locations where utilities are not available.

Other benefits of the embodiments is that because the invention does not have utilities, the scrubber is unlikely to have sparks or catch fire.

The embodiments provide tremendous versatilities because it is modular and can be hooked up in series or in parallel with varying capacities and ability to remove different contaminates.

The scrubber has no moving parts, so it is hard to break and no down times to a user due to maintenance issues.

The scrubber has lower costs for use, because of no down time, no repairs (or few needed), and reduction of regulatory fines and administrative costs resulting from an emission event due to equipment failures.

The scrubber has an efficiency in removal of contaminates of up to about 100 percent and at least about 70 percent.

A volatile compound as described herein can include benzene, toluene, ethylene, xylenes, hexane, ethanols, MTBE, chlorinated hydrocarbons, aromatic compounds, acid gases and combinations thereof.

The housing can be double walled or single walled. The housing can be insulated. The housing can be adapted to provide heat tracing results during use.

The housing can include an interior liner. The liner can surround the reaction zone in the housing. The liner can be film, a thermoplastic or composite coating, a phenolic resin coating, an epoxy paint, a rubber or combinations thereof.

Lean liquid can be filled through a liquid fill port in the housing. One lean liquid or blends of two lean liquids can be used for treating the gases added to the reaction zone.

Turning now to the Figures, FIG. 1 shows a scrubber 2 with a housing 19 on a pedestal 24. Inside the housing 19 can be a reaction chamber 20 with a drain port 22. The drain port 22 can flow to a collection tank 40.

The drain port 22 can be a sump and a drain tube, or a siphon tube can extend into the drain port to remove any liquid in the reaction zone using a pump. The sump and drain tube embodiment can be particularly useful with roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

In an embodiment, the pedestal 24, for supporting the scrubber 2, can have a pedestal access port 26, which can be a square cut entry or rectangular cut entry from about 6 inches by about 8 inches to about 12 inches by about 24 inches for allowing individuals or operators access to the drain valve 23.

Also shown in FIG. 1 is a manway 32 in the housing 19 for providing access to the inside of the housing to clean an maintain the reaction chamber 20 or to replace the sintered permeable membrane 5. The manway 32, in an embodiment can be a locking entry with a diameter of about 20 inches.

The reaction chamber 20 can also have a gas exit port 7. The gas exit port 7 can be from about 3 inches to about 24 inches in diameter and can be used to evacuate scrubbed gas, which shown in detail in FIG. 6, that has been processed with this scrubber 2.

An exit conduit 8, can be connected to the gas exit port 7 for allowing the scrubbed gas to vent to the atmosphere or to another container.

A knock out canister 36, such as those custom made by Proco of Kingsville, Tex., can serve to knock out, remove, or capture any of the liquid that can be entrained in the scrubbed gas. The knock out canister 36 can be located between a vent 38 and the exit conduit 8.

The reaction chamber 20 can be filled with a lean liquid 6 creating a liquid level 21. During scrubbing the lean liquid 6 can move up and down in the reaction chamber 20 providing variable liquid levels 21 with the lean liquid 6 herein.

The lean liquid 6 can be a liquid adsorbent, a liquid solubilizer, a liquid absorbent, a liquid reacting agent or combinations thereof. Examples of lean liquid can include hydraulic oil such as a 10 weight hydraulic fluid, refined diesel fuel, fatty acids such as tall oil, amine solutions, methyl esters, animal fats, combination of an acid leached bentonite and a modified aminoplast resign and a solid hydrophobic material, tannins, oils from animals such as emu oil, biologically derived fluids including palm oil, plant oils. Liquid reacting agents such as acetic acid, phosphoric acid, caustic solutions of sodium hydroxide, water, caustic solutions of potassium hydroxide can be used. The lean liquid may include surfactants such as detergents including, but not limited to, polyethoxylated tallow amine, ethoxylated fatty amines, alkylphenol ethoxylate-based surfactants, alcohol ethoxylate-based surfactants, organosilicones, alcohol ether sulfate, sodium alkyl propoxylated.

The housing 19 can include an interior liner 17. The liner can line the inside of the entire housing. The liner can be film, a thermoplastic or composite coating, a phenolic resin coating, an epoxy paint, a rubber or combinations thereof.

Figure 2:
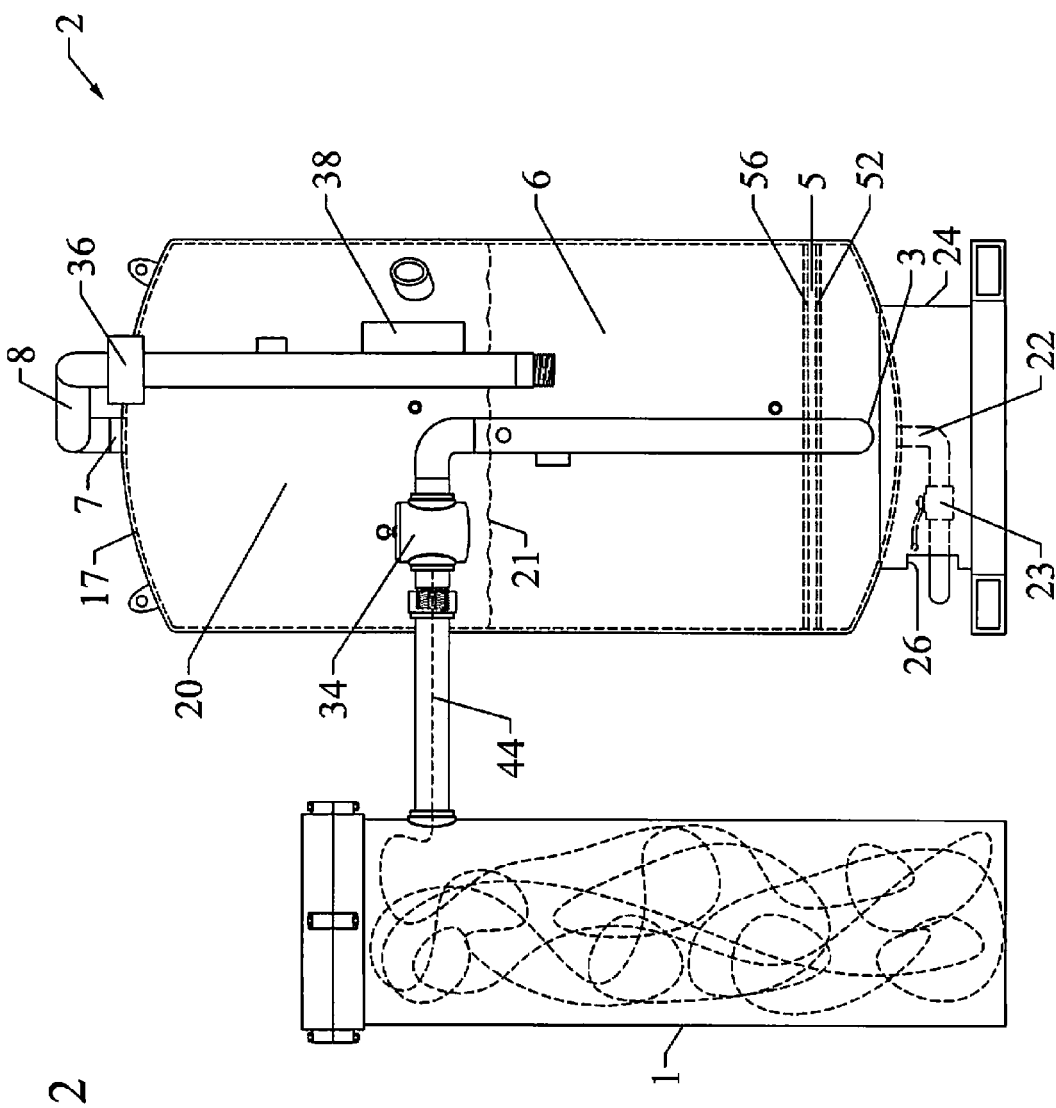
FIG. 2 is an alternative view of the overall system.

The housing 19 can also have an inlet 3. The inlet 3 can be connected to a source, that contains the gases to be scrubbed, which is shown in FIG. 2.

The inlet 3 can be below the liquid level 21 in the reaction chamber 20. The inlet 3 can be about a 3 inch to about 24 inch diameter inlet with flow rates that can range from about 1 cubic feet per minute to about 20,000 cubic feet per minute.

In one or more embodiments, the gas exit port 7 can have an identical diameter as the inlet 3. Also, in one or more embodiments, the gas exit port 7 can have a diameter at least equal to the inlet 3.

In an embodiment, the inlet 3 can be positioned in the housing 19 to insure that the gases to be scrubbed are introduced to the lean liquid initially.

FIG. 1 also shows the sintered permeable membrane 5, with a first side 52 and a second side 56, which can be disposed across the reaction chamber 20, extending from wall to wall of the housing 19, with or without liner 17.

FIG. 2 depicts an alternate embodiment of the scrubber 2 connected to a source 1 of gases to be scrubbed 44.

In FIG. 2, an inlet check valve 34 is shown positioned between a source 1 of gases to be scrubbed 44 and the inlet 3 of the scrubber 2. The inlet check valve 34 can be used to control the flow of gases to be scrubbed 44 through the inlet 3. The inlet check valve 34 can be a low pressure valve, such as from about 1 psi to about 100 psi. The inlet check valve 34 can be a swinging check valve. A feature of the embodiments is that the inlet pressure can be low, making this scrubber safer than high pressure scrubbers.

Figure 3:
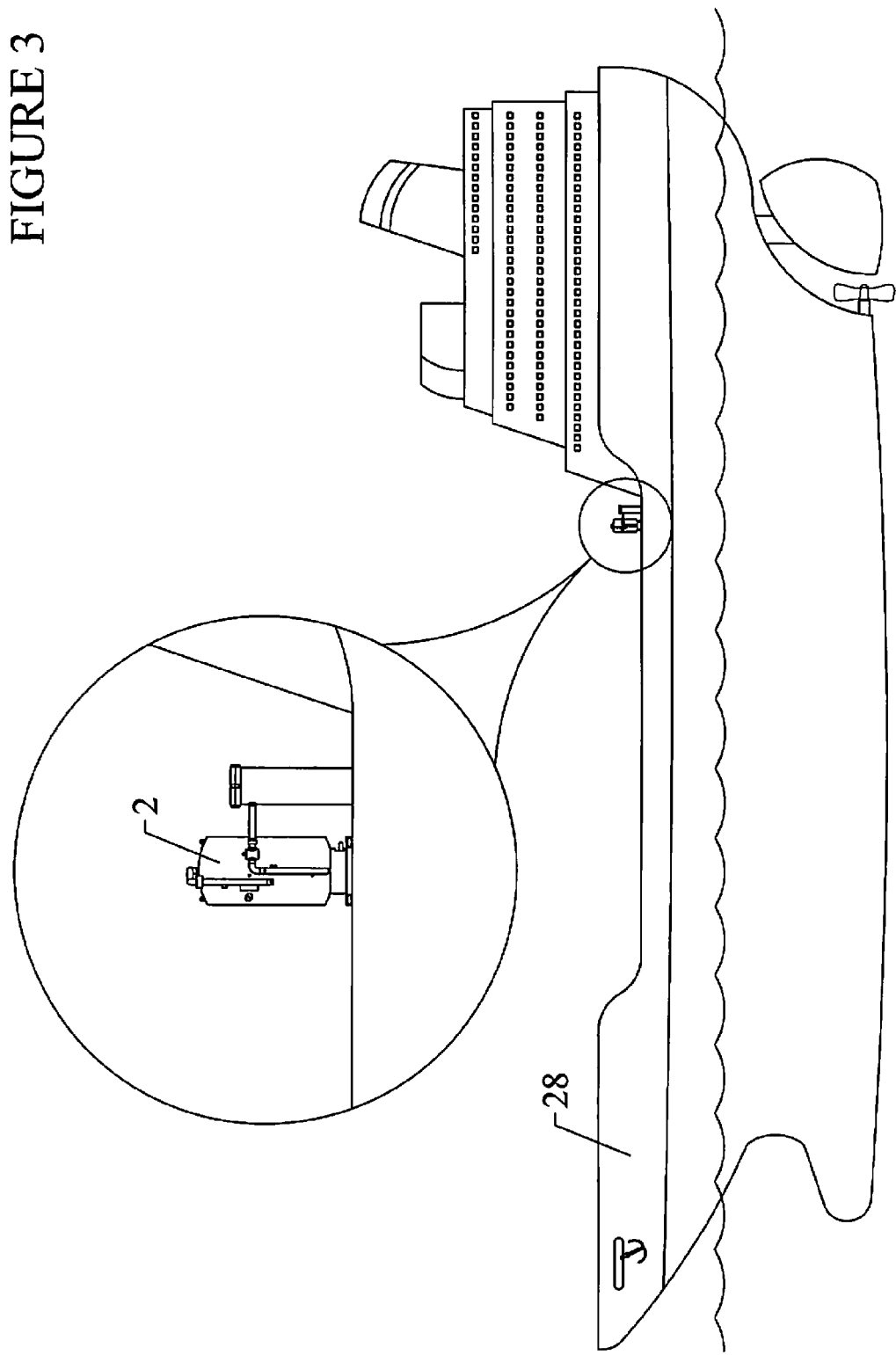
FIG. 3 is an embodiment of the invention on a ship.

FIG. 3 shows an embodiment of the invention with a scrubber 2 on a moveable transport vehicle 28, which is shown in this Figure as a barge.

Figure 4:
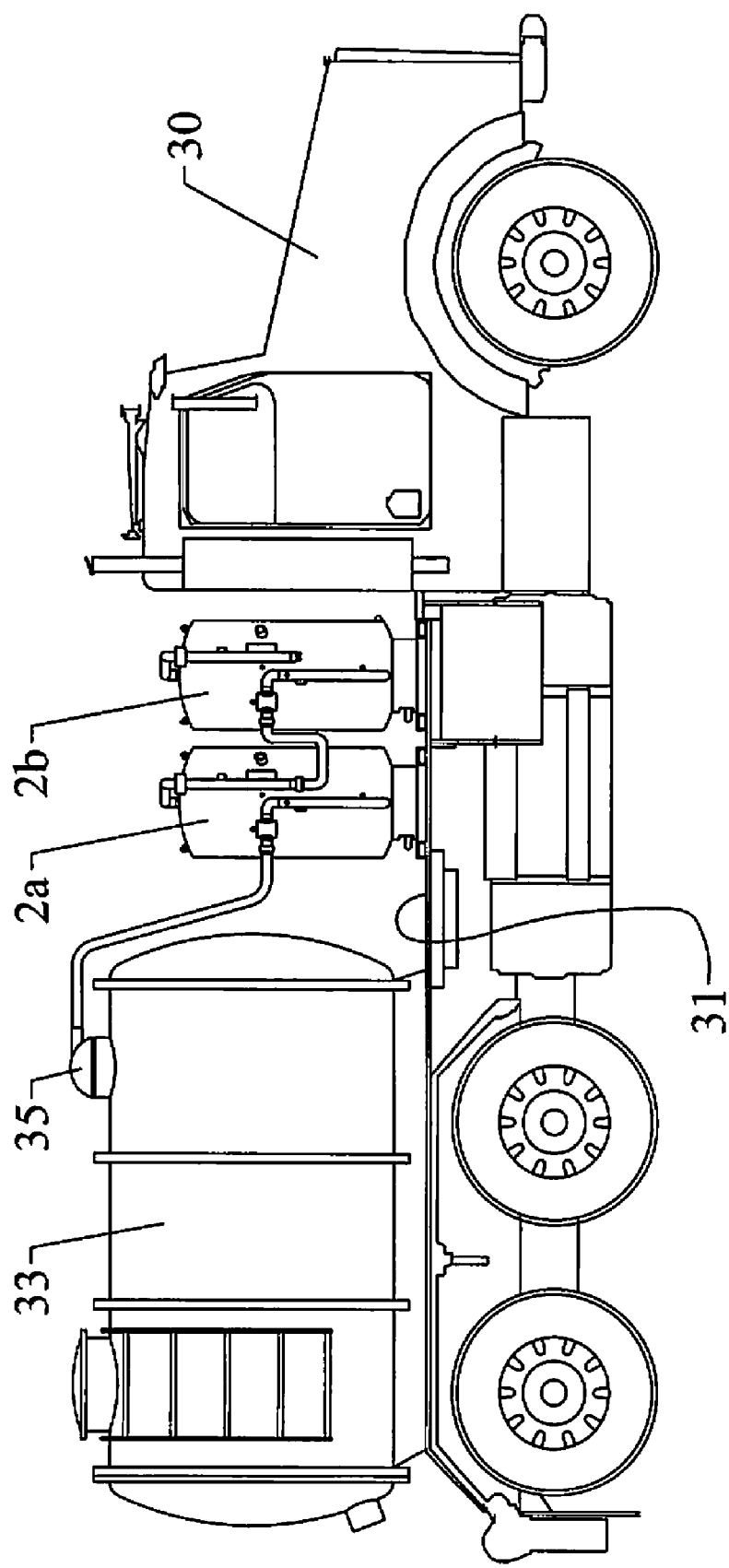
FIG. 4 is an embodiment of the invention on a vacuum truck.

FIG. 4 shows an embodiment of a plurality of scrubbers connected in series on a transport vehicle 30, which is depicted as a truck in this Figure.

This embodiment shows that a first scrubber 2a can connect to a second scrubber 2b and additional scrubbers can be added to provide versatility in capacity of scrubbing gases, such as during a start up from a turn around at a chemical plant, when excess capability might be needed for a short time, but not for a long term solution. The modularity of the scrubbers, the ability to mix and match scrubber sizes to a need of a user provides a unique advantage to this invention. Additionally, if a gas stream needs to be "multiprocessed" that is treated to the same lean liquid repeatedly, the scrubbers connected in series enable this operation style.

FIG. 4 further shows the transport vehicle 30 with a bed 31, a vacuum pump 33 with a vacuum pump exhaust 35. The scrubbers 2a and 2b are connected to the vacuum pump exhaust 35.

In the embodiment of FIG. 4, the scrubbers can be removably connected to the bed 31 of the transport vehicle 30, that is creating a modular transportable system using modular scrubbers.

In one or more embodiments, the scrubbers can be welded to the transport vehicle, creating an immovable scrubber on the bed, while the transport vehicle is moveable.

Figure 5:
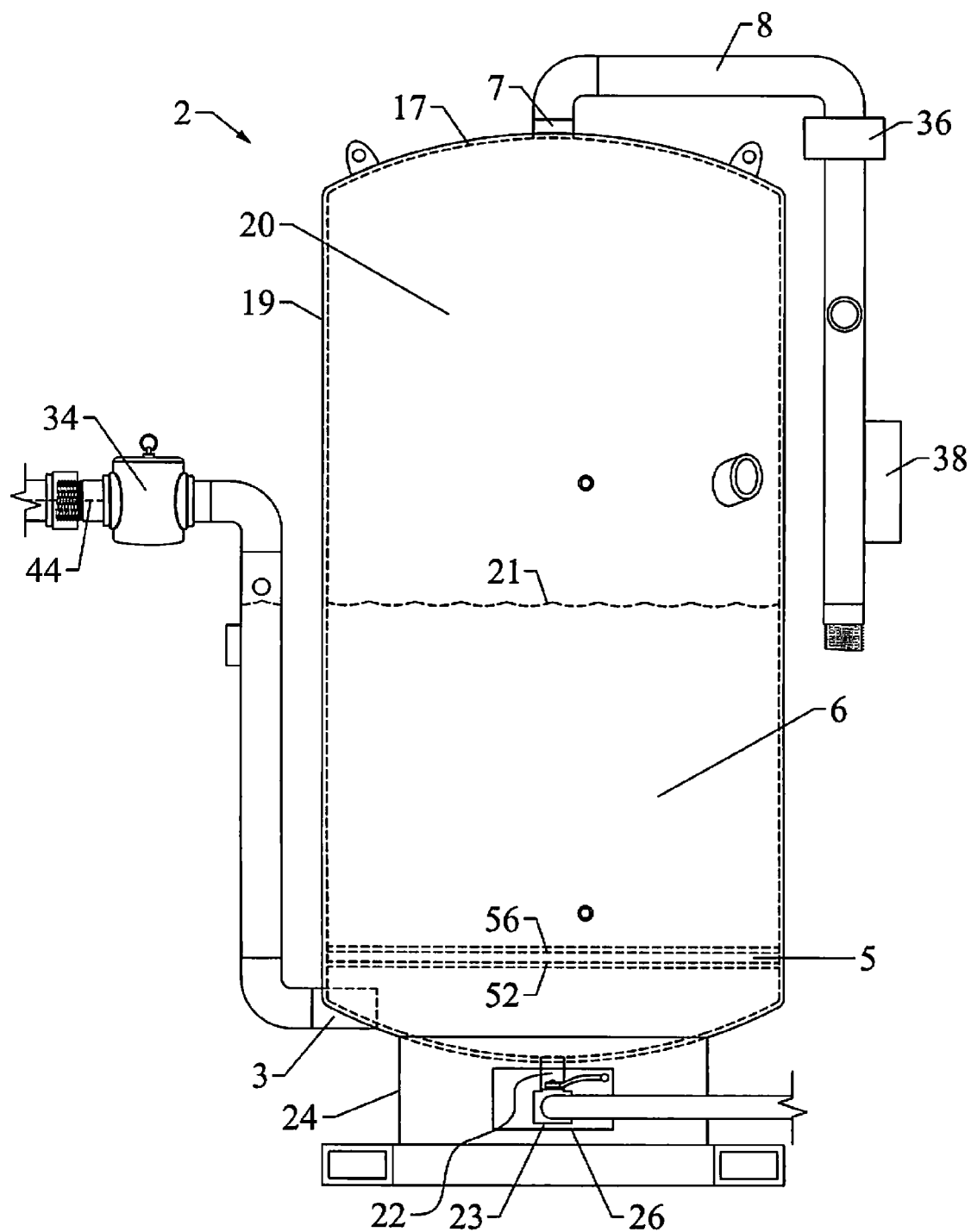
FIG. 5 depicts the system prior to the introduction of gases to be scrubbed to the scrubber.

FIG. 5, shows scrubber 2 with lean liquid 6 prior to introducing the gases to be scrubbed 44 through the inlet 3. Lean liquid 6 is shown filling the reaction chamber 20 on both the first side 52 and the second side 56 of the sintered permeable membrane 5.

Figure 6:
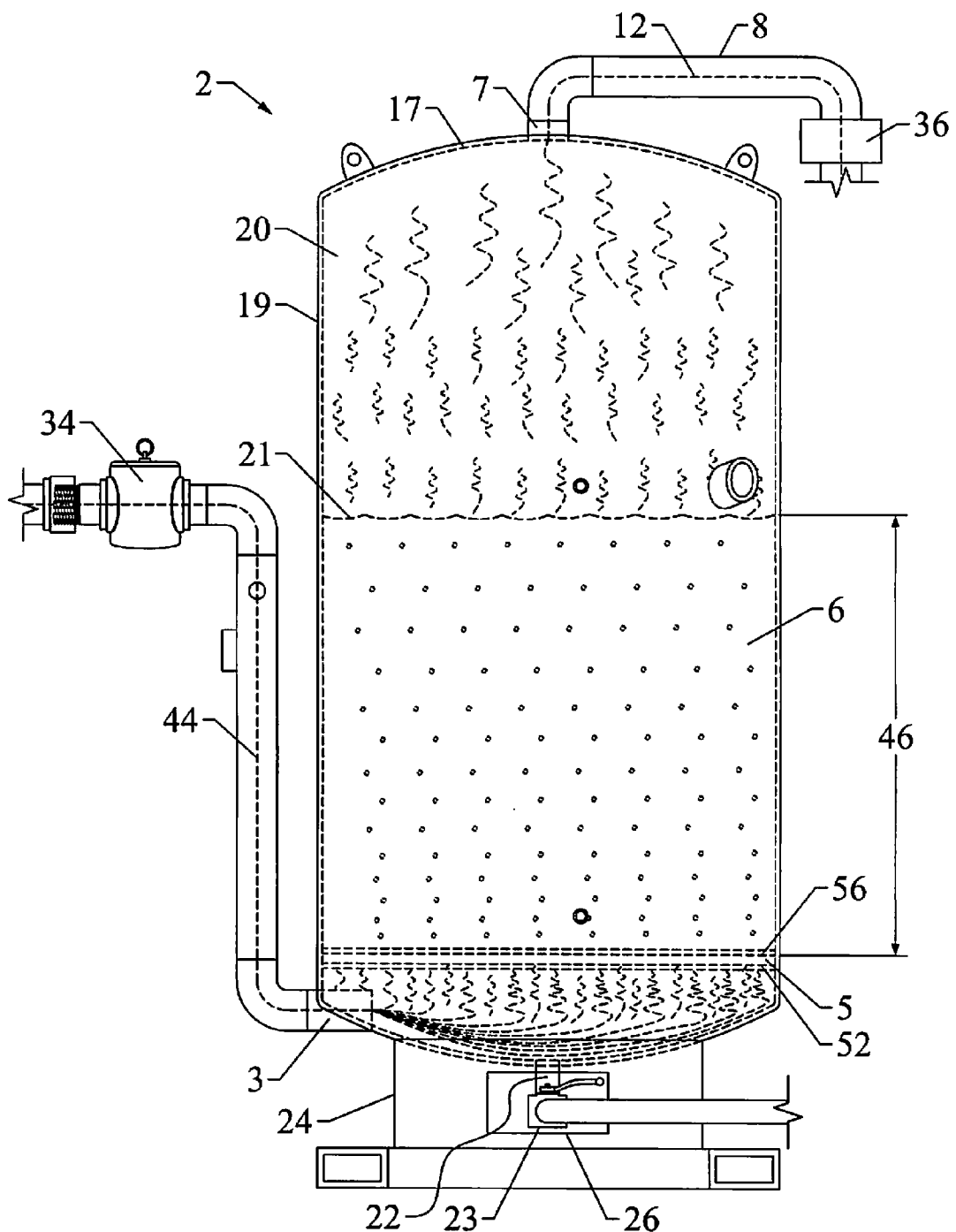
FIG. 6 shows the system after gases to be scrubbed have been introduced to the system.

FIG. 6 depicts the scrubber 2 with lean liquid 6 having moved through the sintered permeable membrane 5. The gases to be scrubbed 44 are shown flowing from the inlet 3 into the reaction chamber 20. The gases to be scrubbed 44 can then pass through the sintered permeable membrane 5 forming the reaction zone 46.

The gases to be scrubbed 44 can have a contamination concentration greater than 0 ppb to saturation, such as in the range of about 20 ppm to about 250 ppm.

The gases to be scrubbed 44 can be gases with contaminates that are volatile organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the gases to be scrubbed.

For example, in Corpus Christi, Tex., a gas to be scrubbed can be a stream of gas with more than about 5 ppm benzene as of Jan. 29, 2009.

The gases to be scrubbed can be anticipated to be gases that exceed federal Environmental Protection Agency "EPA", Title 40 regulations as of Jan. 1, 2009 and Texas Commission on Environmental Quality Title 30 regulations regulatory levels as of Jan. 1, 2009.

The sintered permeable membrane 5 can provide a reaction zone 46 wherein the gases to be scrubbed 44 can be introduced from the inlet 3 to a first side 52 of the membrane. At the start of the process, the sintered permeable membrane 5 can be immersed in the lean liquid and all the pores can then be filled with the lean liquid, which is seen in FIG. 5.

Initially the lean liquid can act as a valve, to control the exit of cleaned gases, enabling pressure to build up in the housing without the need for an additional exit valve, which enables the scrubber to uniquely behave more reliably.

As gases to be scrubbed 44 increase the pressure beneath the sintered permeable membrane 5, the lean liquid 6 can begin to move through the pores with the gases, scrubbing the gases due to the tremendously increased surface area of the pores.

As scrubbing occurs, a "head pressure" can be created and the lean liquid 6 can move into the reaction zone 46 above the sintered permeable membrane 5, the gas to be scrubbed 44 can then be introduced below the sintered permeable membrane 5, in the reaction chamber 20. The gases to be scrubbed 44 can then move through the sintered permeable membrane 5 into the reaction zone 46.

Cleaned gases, which are identified herein as scrubbed gas 12, can flow past a second side 56 of the membrane. The scrubbed gas 12 has a drop in contamination concentration of at least about 99 percent and gradually decreases to about 70 percent as additional gases to be scrubbed are introduced to the housing through the inlet without refilling or replacing the lean liquid.

Scrubbed gas, as the term is used herein refers to gas which has not only passed through the scrubber, but targeted contaminates have been removed and the resulting scrubbed gas meets or exceed EPA or state standards for "clean air" including but not limited to Title 40 for the EPA and the Texas Administrative Code Title 30, Chapter 106 subpart k, part 263 as well as Chapter 115, subpart d, divisional 1, and Chapters 311-319, which state no more than 20 ppm or 90 percent "removal efficiency" that is 90 percent of the contaminates provide "clean air". Other regulations provide a higher contamination concentration as their definition of "clean air."

In an embodiment, the contamination concentration can be between about 562,000 ppm and about 100 ppm for the gases to be scrubbed.

The scrubbed gas 12 can exit the reaction chamber 20 through the gas exit port 7 into the exit conduit 8.

The knock out canister 36 can serve to knock out, remove, or capture any of the liquid that can be entrained in the scrubbed gas 12. The knock out canister 36 can be located between the vent and the exit conduit 8.

Figure 7:
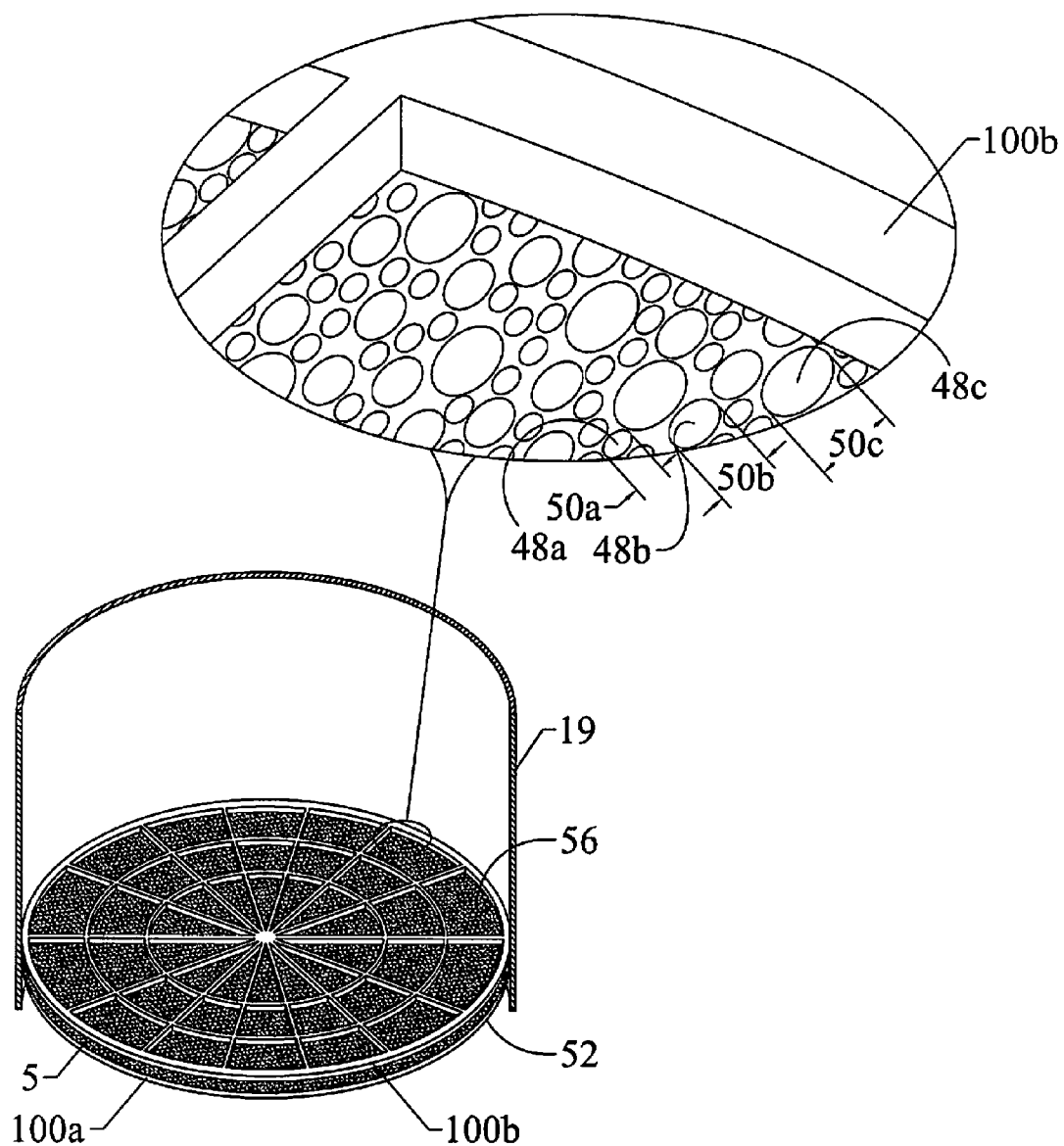
FIG. 7 is a cut view of the housing showing the sintered permeable membrane.

FIG. 7, depicts a partial cut view of the housing 19, without a liner, revealing the sintered permeable membrane 5 with a first side 52 and a second side 56.

The sintered permeable membrane 5 can have pores of identical diameters, such as all being about 50 micron diameters. The pores 48a, 48b, and 48c can have pore diameters 50a, 50b, and 50c. However, the pores can range in diameter between about 1 micron to about 10,000 microns.

The sintered material of the sintered permeable membrane can have void spaces equivalent to between about 40 percent to about 50 percent of the sintered permeable membrane, that is the material making up the membrane can have open spaces that are between about 40 percent to about 50 percent. The sintered material of the sintered permeable membrane can have both internal pores and external pores.

In an embodiment, the void spaces can be greater then 50 percent or less then 40 percent depending upon the sintered material used. For example, if the sintered material used is carbon aerogel, it can have a void fraction of about >680 percent.

The sintered permeable membrane can be from about 1/32 of an inch thick to about 24 inches thick The sintered permeable membrane can be held in place inside the reaction chamber 20 by pad grids 100a and 100b.

The sintered permeable membrane 5 can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

FIG. 8 shows that the scrubbers can be connected in parallel so that several streams can be treated simultaneously. One or more lines, such as lines 2a, 2b, 2c, and 2d can be connected to the source 1. The lines 2a, 2b, 2c, and 2d can be in fluid communication with independent scrubbers.

Between about 2 scrubbers to about 12 scrubbers can be used in this embodiment. Additional scrubbers can be used for this purpose, which can be particularly advantageous in the event of a natural disaster, such as a hurricane, when a plant has gone down due to damage, and needs to be brought back up, but for safety considerations, the streams preventively are run through the scrubbers to insure there are no additional problems, as sensors may have been damaged by the hurricane and accurate detection might be difficult.

While these embodiments have been described with emphasis on the embodiments, it should be understood that within the scope of the appended claims, the embodiments might be practiced other than as specifically described herein.

What is claimed is:

1. A system for removing unwanted contaminates from gases, wherein the system comprises:
    a. a source containing gases to be scrubbed, wherein the gases to be scrubbed have a contamination concentration greater than zero ppb to contamination saturation; and
    b. a scrubber comprising:
        (i) a housing with a reaction chamber, wherein a portion of the reaction chamber contains a lean liquid, and wherein a reaction zone is formed below a liquid level of the lean liquid;
        (ii) an inlet in the housing connected to the source, and wherein the inlet is disposed below the liquid level of the lean liquid; and
        (iii) a gas exit port connected to the housing adapted for evacuating scrubbed gas; a sintered permeable membrane disposed in the reaction zone, wherein the sintered permeable membrane is configured to contact gases to be scrubbed that have been in prior contact with the lean liquid in a portion of the reaction chamber, and wherein the sintered permeable membrane provides an interface for enhanced contact of the gases to be scrubbed and the lean liquid, and wherein the sintered permeable membrane is sandwiched between two pad grids, wherein the pad grids secure the sintered permeable membrane in the housing, and wherein the sintered permeable membrane comprises open spaces that are from 40 percent to 50 percent, and wherein the sintered permeable comprises a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials.

2. The system of claim 1, wherein the sintered permeable membrane comprises pores with different pore sizes.

3. The system of claim 1, wherein the housing further comprises a drain port disposed through the housing communicating with the reaction zone.

4. The system of claim 3, further comprising a drain valve for controlling flow from the drain port disposed between the housing and a collection tank.

5. The system of claim 1, wherein the lean liquid comprises a liquid adsorbent, a liquid solubilizer, a liquid absorbent, a liquid reacting agent, water, surfactants, or combinations thereof.

6. The system of claim 1, wherein the contaminates comprise volatile organic compounds, hazardous air pollutants, hydrogen sulfides, ammonia, sulfur dioxide and combinations thereof.

7. The system of claim 1, wherein the housing further comprises a liner within the housing surrounding the reaction zone.

8. The system of claim 1, further comprising an exit conduit connected to the gas exit port.

9. The system of claim 8, further comprising a knock out canister disposed between the exit conduit and a vent.

10. The system of claim 1, further comprising a pedestal for supporting the scrubber, wherein the pedestal comprises a pedestal access port connecting to a drain port located on the housing.

11. The system of claim 1, further comprising a manway disposed in the housing for providing access to the reaction chamber.

12. The system of claim 1, further comprising an inlet check valve to control the flow of gases to be scrubbed through the inlet.

* * * * *